US011133037B1

United States Patent
Kalish et al.

(10) Patent No.: US 11,133,037 B1
(45) Date of Patent: Sep. 28, 2021

(54) SYSTEM AND METHOD FOR GENERATING DYNAMIC MEDIA

(71) Applicant: Idomoo LTD, Raanana (IL)

(72) Inventors: Danny Kalish, Raanana (IL); Eric Robert Yudin, Tel Aviv-Jaffa (IL); Ariel Marcos Isaac Nehmad, Ramat Gan (IL)

(73) Assignee: Idomoo LTD, Raanana (IL)

( * ) Notice: Subject to any disclaimer, the term of this patent is extended or adjusted under 35 U.S.C. 154(b) by 0 days.

(21) Appl. No.: 16/931,984

(22) Filed: Jul. 17, 2020

(51) Int. Cl.
  *G11B 27/34* (2006.01)
  *H04N 21/4402* (2011.01)
  *G06F 16/73* (2019.01)
  *H04N 21/433* (2011.01)
  *G11B 27/031* (2006.01)
  *H04N 21/84* (2011.01)

(52) U.S. Cl.
  CPC .............. *G11B 27/34* (2013.01); *G06F 16/73* (2019.01); *G11B 27/031* (2013.01); *H04N 21/4331* (2013.01); *H04N 21/4402* (2013.01); *H04N 21/84* (2013.01)

(58) Field of Classification Search
  CPC ....... G11B 27/34; G11B 27/031; G06F 16/73; H04N 21/4331; H04N 21/4402; H04N 21/84
  See application file for complete search history.

(56) References Cited

U.S. PATENT DOCUMENTS

| | | | | |
|---|---|---|---|---|
| 10,349,106 | B1* | 7/2019 | Whitehead | ......... G06Q 30/0277 |
| 2011/0075990 | A1* | 3/2011 | Eyer | ................... H04N 21/4722 |
| | | | | 386/241 |
| 2013/0263182 | A1* | 10/2013 | Ivy | ..................... H04N 21/4622 |
| | | | | 725/34 |

* cited by examiner

Primary Examiner — Mishawn N. Hunter
(74) Attorney, Agent, or Firm — Browdy and Neimark, P.L.L.C.

(57) ABSTRACT

A method for generating customized dynamic video including partitioning customized dynamic video's timeline, using a predefined partition scheme, into a series of chunk descriptors, each defined by an interval of the timeline and corresponding to a video chunk of the customized dynamic video; for each chunk descriptor, constructing an identifier based on a set of parameters that represent visual characteristics of the video chunk, and associating the identifier to the chunk descriptor, and querying a cache of previously rendered and encoded video chunks for a video chunk indexed by the identifier matching that of the chunk descriptor; and in the case that a video chunk whose identifier matches the queried identifier is found, retrieving the video chunk from the cache; otherwise, rendering and encoding the video chunk, for the chunk descriptor's timeline interval, and saving the video chunk in the cache, indexed by the identifier.

40 Claims, 19 Drawing Sheets

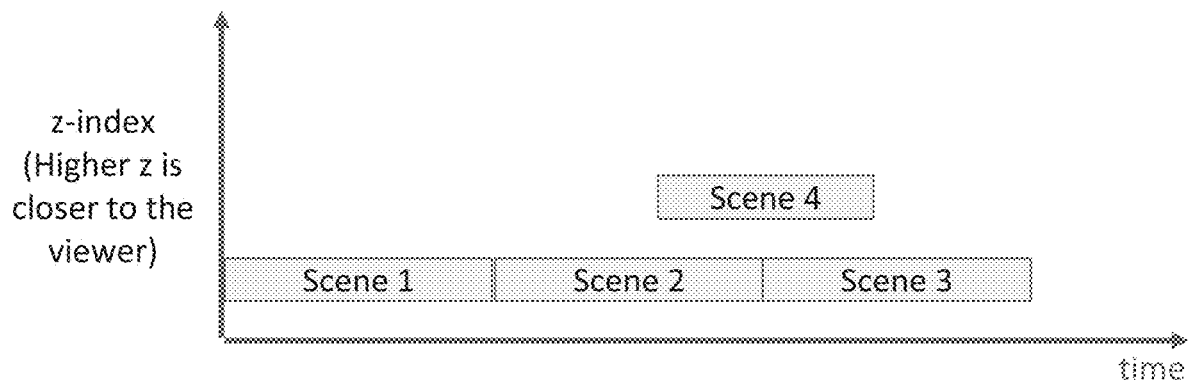
Figure 1 (PRIOR-ART)

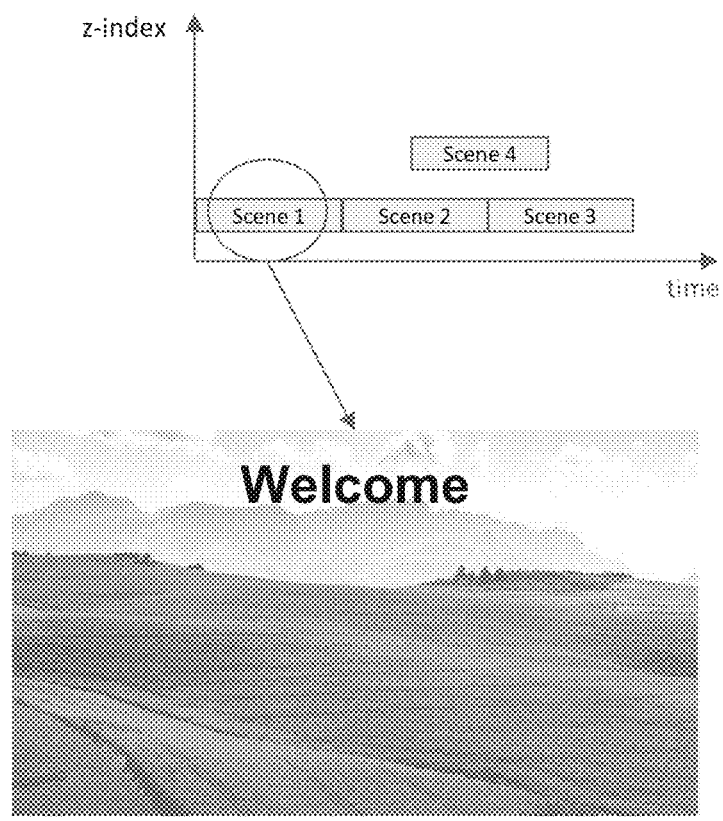
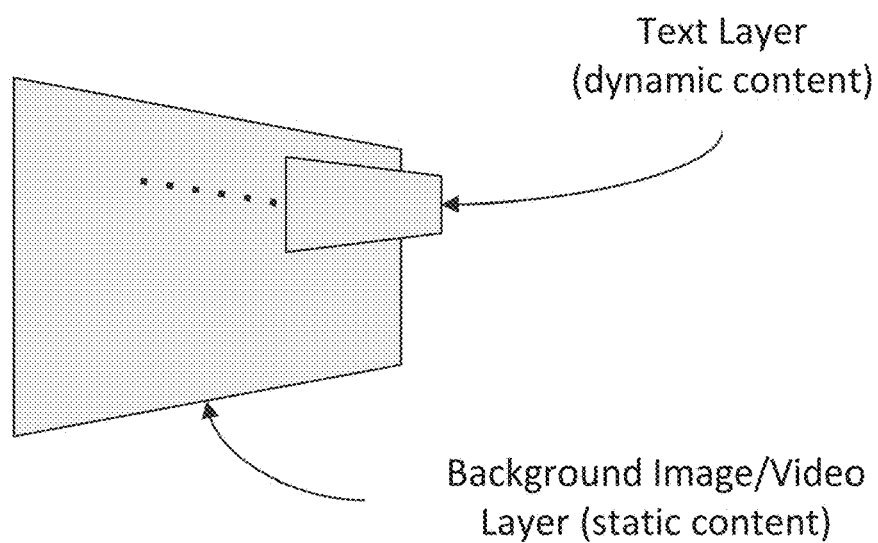
Figure 2A (PRIOR-ART)

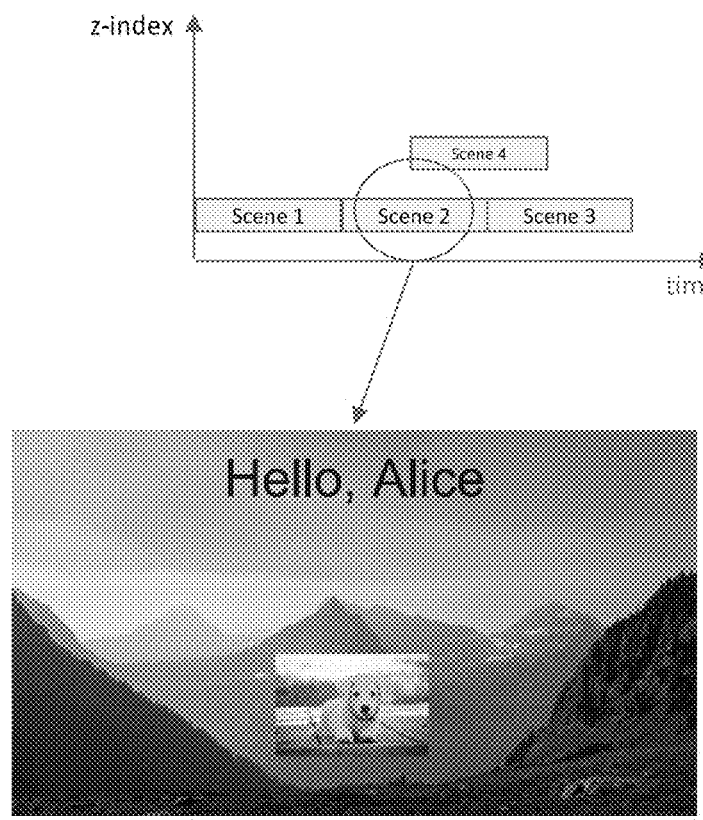
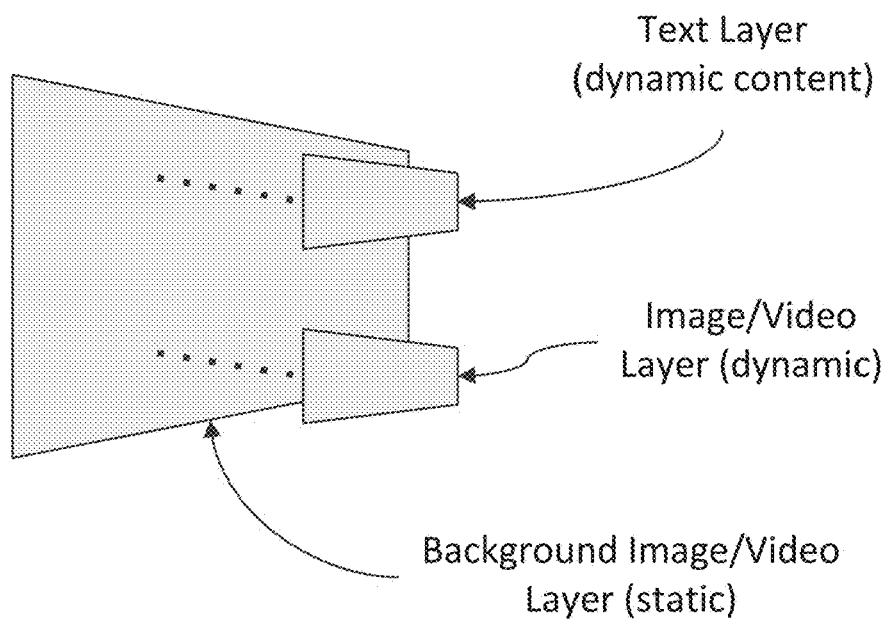
Figure 2B (PRIOR-ART)

Video Partitioning Module 1320A

Input: Description of the timeline of the desired output video.

Partition the video timeline into a set of video chunk descriptors, effectively partitioning the video into video chunks, according to a predefined scheme. Each chunk descriptor corresponds to a chunk of the output video.

Depending on the embodiment, the scheme may involve some or all of the options and/or constraints mentioned below. However, the same scheme should be used ubiquitously (across all movies) in order to heighten the likelihood of chunk cache hits.          1322

The predefined partitioning scheme may be a combination and/or integration of one or more of the following:

Option 1 - The video timeline is partitioned at scene boundaries.     1326

Option 2 - The video timeline is partitioned according to the intervals during which dynamic objects influence the visual configuration or characteristics of the chunk.
1328

Option 3 - The video timeline is partitioned into intervals of fixed length.          1340

Option 4 - The video timeline is partitioned according to intervals with constant-color video information.          13__

Option 5 - The video timeline is partitioned according to intervals with no dynamic video content.          13__

Constraint 1: Video chunk lengths must be greater than some minimal length.          13__

Constraint 2: Video chunk lengths must be smaller than some maximal length.          13__

Figure 4A

Audio Partitioning Module 1320B

Input: Description of the timeline of the desired output audio.

Partition the audio timeline into a set of audio chunk descriptors, effectively partitioning the audio into audio chunks, according to a predefined scheme. Each chunk descriptor corresponds to a chunk of the output video.

Depending on the embodiment, the scheme may involve some or all of the options and/or constraints mentioned below. However, the same scheme should be used ubiquitously (across all movies) in order to heighten the likelihood of chunk cache hits.      1322B The predefined partitioning scheme may be a combination and/or integration of one or more of the following:

Option 1 - The audio timeline is partitioned at scene boundaries.
1326B

Option 2 - The audio timeline is partitioned according to the times at which dynamic audio objects influence the sonic configuration or characteristics of the chunk.      1328B Option 3 - The audio timeline is partitioned into intervals of fixed length.      1340B Option 4 - The audio timeline is partitioned based on silent intervals.. 13__

Option 5 - The video timeline is partitioned according to intervals with no dynamic audio content.      13__

Constraint 1: Audio chunk lengths must be greater than some minimal length.      13__

Constraint 2: Audio chunk lengths must be smaller than some maximal length.      13__

Figure 4B

Video Chunk Identifying Module   1340A

Responsibility: Computing a value that uniquely identifies the visual and temporal configuration of the chunk. In some embodiments, this computation may be based on the high-level JSON description. In common embodiments, this computation may involve hashing, and so for convenience they are referred to as such.   1342A Compute some or all of the following values, which will be sub-components of the final chunk identifier:

Computing a *duration hash*: a value representing the duration of the interval associated with the chunk.   1350 A Computing a *static hash*: a value representing all static video elements that appear in the chunk, and their configurations.   1344A Computing a *dynamic hash*, a value representing all dynamic video elements that appear in the chunk, and their configurations.   1346A Only factor a dynamic element into the computation of the dynamic hash if it influences the visual configuration of the chunk.   1346AA Computing an *encoder hash*, a value representing the video encoder and its configuration, e.g., output resolution, codec (h264, png, etc), fps, codec configuration.   1348A Then, with the above computed:

Combine some or all of the above values using an appropriate operation to generate a combined UID/hash that is adequately unique to the visual configuration of the chunk.   1352A

Figure 5A

Audio Chunk Identifying Module 1340B

Responsibility: Computing a value that uniquely identifies the sonic and temporal configuration of the chunk. In some embodiments, this computation may be based on the high-level JSON description. In common embodiments, this computation may involve hashing, and so for convenience they are referred to as such.   1342B Compute some or all of the following values, which will be sub-components of the final chunk identifier:

Computing a *duration hash*: a value representing the duration of the interval associated with the chunk.   1350 B Computing a *static hash*: a value representing all static audio elements that will be present in the chunk, and their configurations.   1344B Computing a *dynamic hash*, a value representing all dynamic audio elements that appear in the chunk, and their configurations.   1346B Only factor a dynamic element into the computation of the dynamic hash if it influences the sonic configuration of the chunk.   1346BB Computing an *encoder hash*, a value representing the audio encoder and its configuration, e.g., output bitrate, codec (wav, aac, mp4, etc), codec configuration.   1348B Then, with the above computed:

Combining some or all of computed values with an appropriate operation to generating a combined UID/hash that is adequately unique to the sonic configuration of the chunk.   1352B

Figure 5B

Chunk Cache Module   1360

Input: UID/hash of a chunk

If a chunk with this UID/hash already exists in the Chunk Cache Database 120, it may be retrieved straightaway and handed off to the consumer (typically the Merge Module 1400); alternatively, the chunk consumer may be notified of its availability. Either way, there is no need to render/encode the chunk.   1364

If a chunk with this UID/hash does not exist in the Chunk Cache Database 120, the video rendering module 1380 is activated and instructed to render/encode the chunk from scratch based on the information given by the associated chunk descriptor.   1366

Figure 6

Video or Audio Rendering Module - non-optimized case  xxxx

Input: A list of chunk descriptors, containing a reference to an interval of the timeline, along with the UID/hash information calculated in the Chunk Identifying Module 1340A/B    1362

Choose one chunk descriptor from the list.

For each frame F in the target chunk's frame range, render and encode the frame, and write the result to the storage location designated for the chunk.

Store chunk in the Chunk Cache Database, with full hash as key.   1368

Perform the above for all chunk descriptors requested to be rendered.

[Input] Chunk Descriptors

Chunk Rendering Module (Video or Audio) Non-optimized case   1380

Chunk Descriptor

For each frame $F_i$

Render $F_i$

Encode $F_i \rightarrow F'_i$

Write $F'_i$ to Chunk

Chunk C

Chunk Cache Database   120

Figure 7A

Video or Audio Rendering Module - SSMD case    xxxx

| Input: A list of chunk descriptors, containing a reference to an interval of the timeline, along with the UID/hash information calculated in the Chunk Identifying Module 1340A/B    1362 |
|---|
| Choose two or more chunk descriptors that share identical *static hash* values.    1370, 1374 |
| Calculate the union of their frame ranges, U. In some embodiments, they will all have identical frame ranges. |
| For each frame F in U, and for each chosen chunk descriptor C, if F is in C's frame range, render and encode F, and write the result to the storage location designated for C. While rendering, if the static component has already been rendered, and the result, or some preliminary copy, has not been modified by successive rendering operations for the current frame, do not render the static component again for the current frame.    1372 |
| Store chunk in the Chunk Cache Database, with full hash as key.    1368 |
| Perform the above for all chunk descriptors requested to be rendered, where relevant and if applicable. |

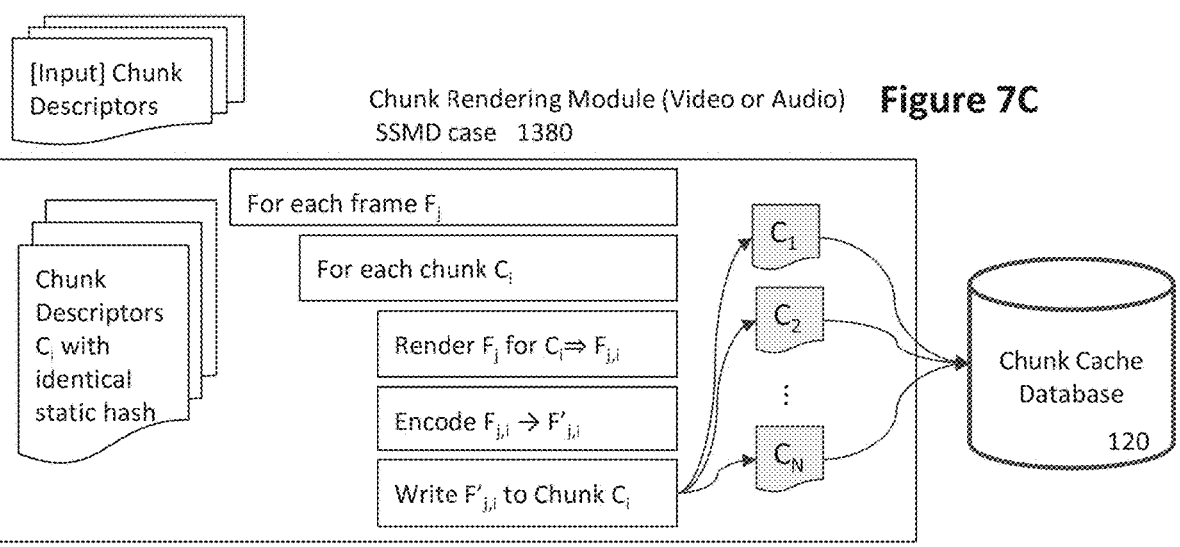

Chunk Rendering Module (Video or Audio) Figure 7C
SSMD case  1380

Rendering Module execution - SSMD case time

Begin Chunks $C_1, ..., C_K$

Do frame $f_1$ for all K chunks in set:
Render $C_1.f_1$.static

Render $C_1.f_1$.dynamic
Encode $C_1.f_1$ to $C_1$
Render $C_2.f_1$.dynamic
Encode $C_2.f_1$ to $C_2$

...

Render $C_K.f_1$.dynamic
Encode $C_K.f_1$ to $C_K$

...

Do frame $f_N$ for all K chunks in set:
Render $C_1.f_N$.static

Render $C_1.f_N$.dynamic
Encode $C_1.f_N$ to $C_1$
Render $C_2.f_N$.dynamic
Encode $C_2.f_N$ to $C_2$

...

Render $C_K.f_N$.dynamic
Encode $C_K.f_N$ to $C_K$

End Chunks $C_1, ..., C_K$

Figure 7D

Merging Module 1400

Given: a description of everything needed for the final movie.

Perform some or all of the following steps:

If the final media output should contain visual information, receive all rendered video chunks from the chunk cache database 120 or from the Video Rendering Module 1380 and assemble from them the video stream(s) that will be included in the final media container.
1402A If the final media output should contain audio information, receive all rendered audio chunks from the chunk cache database 120 or from the Audio Rendering Module xxxx and assemble from them the audio stream(s) that will be included in the final media container.     1402B If the final media output should contain other information such as subtitles or metadata, receive this additional information and prepare one or more streams for them that will be included in the final media container.     1404

Merge all streams to produce the final media output.     1406

Figure 8

Chunk hashing algorithm example:

```
Hash/UID components for Chunk c:

c.duration ← hash(c.end - c.begin)

c.encode ← combine({ hashes of all encoding settings })

for each Scene s in scenes affecting c:
    ❖  scene_pos_wrt_chunk ← hash(s.begin - c.begin)
    ❖  ozv ← hash(index of s in scenes.sort_by_z_value())
    ❖  c.static ← combine(c.static, s.static, ozv,
                          scene_pos_wrt_chunk)
    ❖  c.dynamic ← combine(c.dynamic, s.dynamic, ozv,
                           scene_pos_wrt_chunk)

c.full ← combine(c.duration, c.encode, c.static, c.dynamic)
```

Figure 10

SYSTEM AND METHOD FOR GENERATING DYNAMIC MEDIA

FIELD OF THE INVENTION

The present invention relates generally to the field of dynamic video generation. More specifically, the present invention relates to methods for generating personalized dynamic videos.

BACKGROUND OF THE INVENTION

Personalized videos are videos whose content can be tailored to the end-viewer. Similar to form mail, in which a template is filled in and altered with information specific to the target reader, personalized videos are constructed from one or more video template elements that can be combined and adjusted to enhance the viewing experience of the intended audience.

Personalized videos are used widely in marketing, sales, customer care and social media as people-centric solutions that deliver unparalleled levels of customer engagement and action. They are further used in industries such as telecommunication, utilities, banking, insurance, retail, automotive and others to support customer acquisition and customer relationship management.

Producing a video involves two fundamental operations: rendering, which determines the pixel colors for each output frame; and encoding, which transforms the video data into a form suitable for storage, potentially compressing the data in the process. These operations are known to be expensive and thus usually consume the most time during the video generation process.

A video may also contain audio information, and the case of audio may be thought of analogously. The audio case thus also involves a rendering process that determines the amplitude level(s) for each audio data sample, and an encoding process that transforms and potentially compresses the audio data.

Current technology allows for personalized videos to be rendered and encoded with the aid of parallel processing systems, specifically graphical processing units (GPUs) or other related technologies. Even so, as the rendering and encoding are the fundamental operations, their computation represents a significant portion of the processing pipeline, and this translates to significant cost over multitudes of videos. The current invention concerns itself with avoiding rendering and/or encoding operations where possible by reusing previously rendered and/or encoded results.

In the following exposition, the terms "dynamic" and "personalized" are used interchangeably. The terms "hash", "UID" and "unique identifier" are used interchangeably as well. Finally, the term 'video' may bring about some confusion. In our more technical discussions, 'video' refers to the visual data, distinguishable from audio data and other information types. Meanwhile, in higher-level discussions, we intend the more popular usage, referring to what the end-viewer sees: a combination of video and audio (and perhaps subtitle, etc.) information, taken together as a full experience. In the latter context, 'video' and 'media' are used interchangeably.

BRIEF SUMMARY

The present invention provides a method for generating customized dynamic video, implemented by one or more processors operatively coupled to a non-transitory computer readable storage device, on which are stored modules of instruction code that when executed cause the one or more processors to perform said method comprising the steps of:
 a. receiving a request to generate a customized dynamic video;
 b. partitioning said customized dynamic video's timeline, using a predefined partition scheme, into a series of chunk descriptors, each defined by an interval of the timeline and corresponding to a video chunk of the customized dynamic video;
 c. for each chunk descriptor, constructing an identifier based on the combination of a set of parameters that represent visual, temporal and other characteristics of the video chunk, and associating said identifier to the chunk descriptor;
 d. for each chunk descriptor, querying a cache of previously rendered and encoded video chunks for a video chunk indexed by the identifier matching that of the chunk descriptor;
 e. in the case that a video chunk whose identifier matches the queried identifier is found, retrieving said video chunk from the cache;
 f. otherwise, rendering and encoding the video chunk, as specified by the request, for the chunk descriptor's timeline interval, and saving said video chunk in the cache, indexed by the identifier;
 g. merging the video chunks to create the customized dynamic video.

According to some embodiments of the present invention wherein the predefined partition scheme involves partitioning the video timeline at scene boundaries.

According to some embodiments of the present invention predefined partition scheme involves partitioning the video timeline at times when one or more dynamic objects enters into or exits from the video.

According to some embodiments of the present invention the predefined partition scheme involves partitioning the video timeline into fixed-sized intervals.

According to some embodiments of the present invention the predefined partition scheme involves partitioning the video timeline around segments with constant color.

According to some embodiments of the present invention the partitions created by the predefined partition scheme are constrained by predefined partition size.

According to some embodiments of the present invention identifier is a hash value and/or based on the result of some hashing algorithm.

According to some embodiments of the present invention hashing calculation comprises at least one of the following components of hash computing or some combination thereof:
 a. computing the duration hash, representing the duration of the interval associated with the chunk;
 b. computing the static hash, representing the configuration of static elements of the video contained on the interval associated with the chunk;
 c. computing the dynamic hash, representing the configuration of dynamic elements in the video associated with the chunk;
 d. computing the encoder hash, representing the encoder of the video and its configuration.

According to some embodiments of the present invention the chunk includes only part of a video frame.

According to some embodiments of the present invention the chunk descriptor stores intermediate values used to construct the final identifier.

According to some embodiments of the present invention two or more video chunks' static components, identified as identical based on their static hash values, are generated only once but used to render two or more video chunks.

According to some embodiments of the present invention two or more dynamic videos are generated at the same time, wherein said chunks with identical static components may belong to different output videos.

According to some embodiments of the present invention said chunks with identical static components belong to the same output video.

According to some embodiments of the present invention the video timeline consists of a single frame and the output video comprises a still image.

The present invention provides a method for generating customized dynamic audio, implemented by one or more processors operatively coupled to a non-transitory computer readable storage device, on which are stored modules of instruction code that when executed cause the one or more processors to perform said method comprising the steps of:

e. receiving a request to generate a customized dynamic audio;

f. partitioning said customized dynamic audio's timeline, using a predefined partition scheme, into a series of chunk descriptors, each defined by an interval of the timeline and corresponding to an audio chunk of the customized dynamic audio;

g. for each chunk descriptor, constructing an identifier based on the combination of a set of parameters that represent visual, temporal and other characteristics of the audio chunk, and associating said identifier to the chunk descriptor;

h. for each chunk descriptor, querying a cache of previously rendered and encoded audio chunks for a audio chunk indexed by the identifier matching that of the chunk descriptor;

i. in the case that an audio chunk whose identifier matches the queried identifier is found, retrieving said audio chunk from the cache;

j. otherwise, rendering and encoding the audio chunk, as specified by the request, for the chunk descriptor's timeline interval, and saving said audio chunk in the cache, indexed by the identifier;

k. merging the audio chunks to create the customized dynamic audio.

According to some embodiments of the present invention the predefined partition scheme involves partitioning the audio timeline at scene boundaries.

According to some embodiments of the present invention the predefined partition scheme involves partitioning the audio timeline at times when one or more dynamic audio elements starts or stops playing.

According to some embodiments of the present invention the predefined partition scheme involves partitioning the audio timeline into fixed-sized intervals.

According to some embodiments of the present invention the predefined partition scheme involves partitioning the audio timeline around silent segments.

According to some embodiments of the present invention the partitions created by the predefined partition scheme are constrained by predefined partition size.

According to some embodiments of the present invention the identifier is a hash value and/or based on the result of some hashing algorithm.

According to some embodiments of the present invention the hashing calculation comprises at least one of the following components of hash computing or some combination thereof:

l. computing the duration hash, representing the duration of the interval associated with the chunk;

m. computing the static hash, representing the configuration of static elements of the audio contained on the interval associated with the chunk;

n. computing the dynamic hash, representing the configuration of dynamic elements in the audio associated with the chunk;

o. computing the encoder hash, representing the encoder of the audio and its configuration.

According to some embodiments of the present invention the chunk descriptor stores intermediate values used to construct the final identifier.

According to some embodiments of the present invention two or more audio chunks' static components, identified as identical based on their static hash values, are generated only once but used to render two or more audio chunks.

According to some embodiments of the present invention wherein two or more dynamic audio are generated at the same time, wherein said chunks with identical static components may belong to different output audio.

According to some embodiments of the present invention wherein said chunks with identical static components belong to the same output audio.

The present invention provides a system for generating customized dynamic video, implemented by one or more processors operatively coupled to a non-transitory computer readable storage device, which comprise the module of:

p. partitioning nodule partitioning a requested customized dynamic video's timeline, using a predefined partition scheme, into a series of chunk descriptors, each defined by an interval of the timeline and corresponding to a video chunk of the customized dynamic video;

q. checking module for constructing an identifier for each chunk descriptor, based on the combination of a set of parameters that represent visual, temporal and other characteristics of the video chunk, and associating said identifier to the chunk descriptor;

and, querying for each chunk descriptor, a cache of previously rendered and encoded video chunks for a video chunk indexed by the identifier matching that of the chunk descriptor;

wherein in the case that a video chunk whose identifier matches the queried identifier is found, retrieving said video chunk from the cache;

otherwise, rendering and encoding the video chunk, as specified by the request, for the chunk descriptor's timeline interval, and saving said video chunk in the cache, indexed by the identifier;

r. merging module for merging the video chunks to create the customized dynamic video.

According to some embodiments of the present invention the predefined partition scheme involves partitioning the video timeline at scene boundaries.

According to some embodiments of the present invention the predefined partition scheme involves partitioning the video timeline at times when one or more dynamic objects enters into or exits from the video.

According to some embodiments of the present invention the predefined partition scheme involves partitioning the video timeline into fixed-sized intervals.

According to some embodiments of the present invention the predefined partition scheme involves partitioning the video timeline around segments with constant color.

According to some embodiments of the present invention the partitions created by the predefined partition scheme are constrained by predefined partition size.

According to some embodiments of the present invention the identifier is a hash value and/or based on the result of some hashing algorithm.

According to some embodiments of the present invention wherein the hashing calculation comprises at least one of the following components of hash computing or some combination thereof:

s. computing the duration hash, representing the duration of the interval associated with the chunk;
t. computing the static hash, representing the configuration of static elements of the video contained on the interval associated with the chunk;
u. computing the dynamic hash, representing the configuration of dynamic elements in the video associated with the chunk;
v. computing the encoder hash, representing the encoder of the video and its configuration.

According to some embodiments of the present invention the chunk includes only part of a video frame.

According to some embodiments of the present invention the chunk descriptor stores intermediate values used to construct the final identifier.

According to some embodiments of the present invention two or more video chunks' static components, identified as identical based on their static hash values, are generated only once but used to render two or more video chunks.

According to some embodiments of the present invention wherein two or more dynamic videos are generated at the same time, wherein said chunks with identical static components may belong to different output videos.

According to some embodiments of the present invention said chunks with identical static components belong to the same output video.

According to some embodiments of the present invention the video timeline consists of a single frame and the output video comprises a still image.

BRIEF DESCRIPTION OF THE FIGURES

The present invention will be more readily understood from the detailed description of its embodiments as well as the accompanying drawings of which:

FIG. 1 (PRIOR-ART) illustrates the current video rendering technology's dynamic movie timeline. Scenes may be positioned at any point along the time axis as well as at any z-index (where greater z-index corresponds to proximity to the viewer).

FIGS. 2A and 2B (PRIOR-ART) depict two scenes, each of which contains one or more layers of video, images, text or other assets. Several properties, such as timing (start, offset), and z-index, etc., control the configuration of the scene and its constituent layers. Alongside each is a sketch illustrating how the scene is composed of layers of static and dynamic elements.

FIG. 4A is a flow diagram of the module that partitions the video timeline into video chunk descriptors, in accordance with some embodiments of the present invention.

FIG. 4B is a flow diagram of the module that partitions the audio timeline into audio chunk descriptors, in accordance with some embodiments of the present invention.

FIG. 5A is a diagram of the Video Chunk Identifying (Hashing) Module, according to some embodiments of the present invention.

FIG. 5B is a diagram of the Audio Chunk Identifying (Hashing) Module, according to some embodiments of the present invention.

FIG. 6 is a diagram of the Chunk Cache Query module, according to some embodiments of the present invention.

FIG. 7A is a flow diagram of a typical non-optimized execution of the Video Rendering Module, according to some embodiments of the present invention.

FIG. 7C is a flow diagram of an execution of the Video Rendering Module in a case where the Single Static/Multiple Dynamic (SSMD) optimization may be exploited, according to some embodiments of the present invention.

FIG. 7D shows the rendering and encoding events over time for an SSMD-optimized execution of the Video Rendering Module, according to some embodiments of the present invention.

FIG. 8 is a flow diagram of the Merging Module, according to some embodiments of the present invention.

FIG. 10 is an example of a chunk hashing algorithm, according to some embodiments of the present invention.

DETAILED DESCRIPTION OF THE PREFERRED EMBODIMENT

Figure 3:
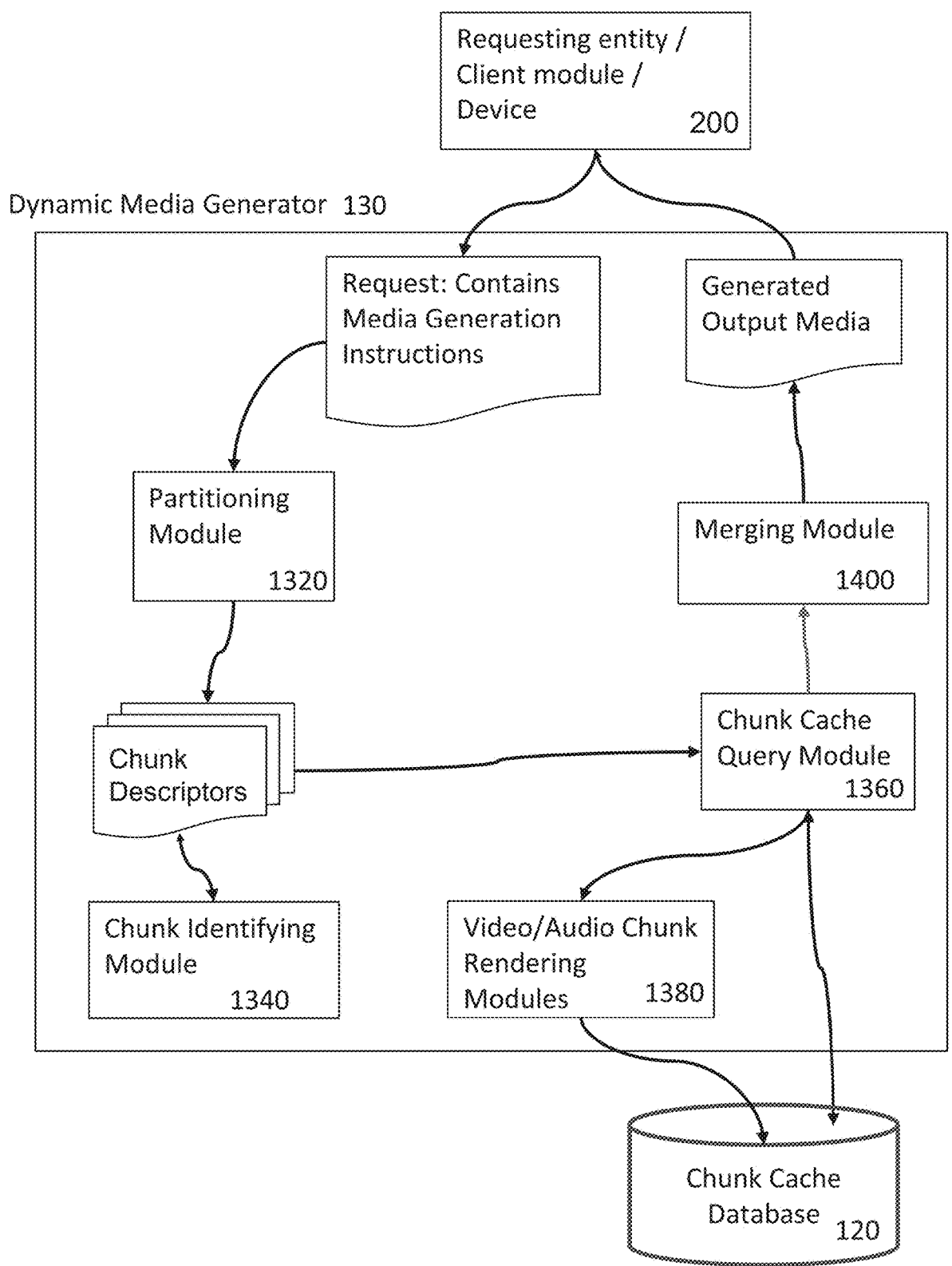
FIG. 3 is a block diagram of a dynamic video generation management system in accordance with some embodiments of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Dynamic Movie Generation: Prior Art

According to current dynamic movie generation technology, as seen in FIG. 1 (PRIOR-ART), a movie is composed of one or more scenes arranged on a timeline in a collage-like form, where each scene sits at a specific time, lasts a specified duration, and is positioned at a specified z-index ("distance" from the viewer). Scenes may be thought of as templatized build blocks. They contain layers, which in turn hold assets such as images, video, text, and audio. Both the containing scene and its constituent layers may expose properties that act as parameters to creation of the video. For example, the scene may expose timing properties such as start time and duration, which control when on the global timeline the scene begins, and how much of the scene to show, or z-index, which governs which controls the front-to-back ordering of the scenes in the event that multiple scenes appear in the video simultaneously. Likewise, the constituent layers may expose properties that govern transparency, alignment properties of the asset with respect to its bounding box, and most notably, the asset itself. By referencing the scene building blocks and specifying values for the exposed properties, a video may be assembled and generated that is customized for the end-viewer. Moreover, this "video collage" may be specified by a high-level object description format such as JSON or XML.

Across thousands or millions of movies, each intended for potentially different end-viewers, some of the assets and properties will vary heavily, and some will be identical. Those that remain the same from video to video are called static, and those that change are called dynamic.

In the example scenes shown in FIGS. 2A and 2B (PRIOR-ART), the backgrounds are static, while the text as well as the image of the dog are dynamic. These dynamic components are also called "placeholders." Thus, in FIGS. 2A and 2B (PRIOR-ART), the text and the foreground image are placeholders.

Each scene's composition, layer and placeholder definitions and the like are described in a predefined format whose function is to serve as a template for that scene. The configuration for each unique movie is then specified with some format/method/notation convenient for specifying hierarchical data structures, such as JavaScript Object Notation (JSON). Specifically, many aspects of the final video may be specified using this simplified format, for instance, which scenes appear in the video, when in time they are scheduled to play, where (in z-space) they sit, which assets will be used to fill which placeholders within each scene, other placeholder attributes (alignment, font, etc), and the like.

For a given video campaign, there are typically many segments that are identical across thousands or millions of videos. For example, parts that have only static content, and parts that are dynamic but have identical placeholder configurations across videos. The present invention exploits this assumption to provide an improved and efficient method for generating dynamic videos that avoids rendering and/or encoding frames parts of the video that have already been rendered and/or encoded.

Dynamic Movie Generation with Chunk Caching

In FIG. 3 we see a block diagram of a Dynamic Media Generator 130 in association with some requesting entity 200 and a Chunk Cache Database 120, in accordance with some embodiments of the present invention. The requesting entity sends to the Dynamic Media Generator 130 a video request comprising a description of the desired configuration of the movie. This description may come in the form of instructions for building the timeline, an object-based description of the timeline (in a format such as JSON), or some other form that adequately describes the visual and sonic configuration of the movie throughout time.

Figure 3A:
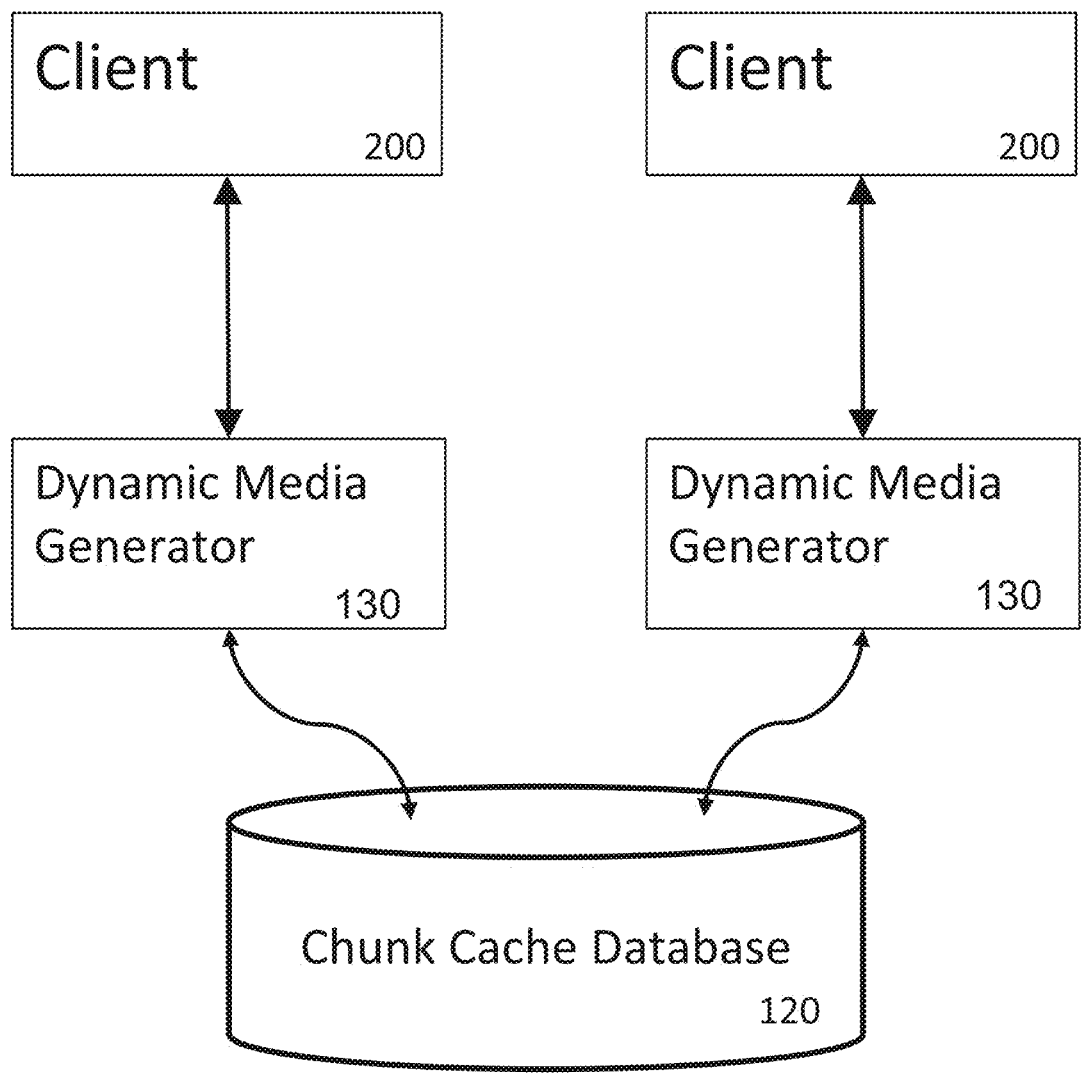
FIG. 3A is a diagram of multiple dynamic video generator modules accessing a single cache database, according to some embodiments of the present invention.

The Dynamic Media Generator 130 consists of a Partitioning Module 1320A and/or 1320B, a Chunk Identifying Module 1340A and/or 1340B, a Chunk Cache Query Module 1360, a Chunk Rendering Module 1380 (A and/or B . . . ), and a Merging Module 1400. Further, the Dynamic Media Generator 130 has associated with it a Chunk Cache Database 120. As seen in FIG. 3A, multiple Dynamic Media Generator modules 130 may use the same Chunk Cache Database 200.

Partitioning the Movie Timeline

The Partitioning Module 1320 splits the timeline described in the request into discrete partitions called chunk descriptors. The main information associated with a chunk descriptor is an identifier (see section Naming Chunks below) and a reference to a time interval on the global movie timeline. The interval information may take the form of start and end times, a start time and a duration, or some equivalent form. Each chunk descriptor will thus be used to render and/or encode a chunk of the final video or audio stream.

The partitioning process operates according to a pre-defined scheme designed to optimize the likelihood of a so-called chunk cache hit. A chunk cache hit occurs when a previously-rendered chunk is found (in the chunk cache database) whose configuration is identical to one described by a chunk descriptor, and thus required by the movie currently being generated. As video rendering/encoding and audio rendering/encoding are separate processes, different partitioning schemes may be used for each. However, the same video and audio schemes should be used across all movies in order to optimize the likelihood of chunk cache hits.

FIGS. 4A and 4B further detail the partitioning process for video and audio, respectively. In both cases, the scheme may involve partitioning into chunks of fixed duration, partitioning via certain properties of the timeline description such as scene or layer boundaries, or partitioning by other means. For video data, there are at least five options, one or more of which may be combined or integrated into a final scheme:

Option 1: Partition based on scene boundaries (step 1326A).

Option 2: Partition based on the intervals during which dynamic layers are visible, or more generally, during which dynamic layers influence the visual configuration of the chunk (step 1328A).

Option 3: Partition into intervals of fixed length (step 1340A)

Option 4: Partition based on blank intervals (i.e. intervals with constant-color video information, e.g. all black).

Option 5: Partition based on intervals with no dynamic video content

In addition to partitioning options, the partitioning scheme may contain constraints:

Constraint 1: Video chunk lengths must be greater than some minimal length.

Constraint 2: Video chunk lengths must be less than some maximal length.

The following is an example of an algorithm implementing a video partitioning scheme that integrates multiple options and constraints:

1. Split the timeline into intervals beginning and ending at scene boundaries (Option 1)
2. Further split each of the generated intervals into intervals of some fixed size (Option 3). If the length of any of the intervals generated in step 1 is not a multiple of the desired fixed size, this step will generate at least one interval of smaller size.
3. If any of the intervals generated in step 2 are smaller than some minimal length, combine these intervals with one of their neighboring intervals.

Note that in this and similar schemes, the partitioning is invariant to the absolute timing of the movie. This property allows for a high likelihood of cache hits even if, for example, a new scene is added to the beginning of the movie (see Toy Examples for concrete examples).

For audio data, there are at least five options, one or more of which may be combined or integrated into a final scheme:
  Option 1: Partition based on scene boundaries (step 1326B).
  Option 2: Partition based on the intervals during which dynamic layers are audible, or more generally, during which dynamic layers influence the aural configuration of the chunk (step 1328B).
  Option 3: Partition into intervals of fixed length (step 1340B)
  Option 4: Partition based on silent intervals (i.e. intervals with no or very quiet audio information).
  Option 5: Partition based on intervals with no dynamic audio content In addition to audio partitioning options, the partitioning scheme may contain constraints:
  Constraint 1: Audio chunk lengths must be greater than some minimal length.
  Constraint 2: Audio chunk lengths must be less than some maximal length.

An audio partitioning algorithm analogous to the video partitioning algorithm described above may be used to illustrate an audio chunk partition scheme.

Naming Chunks

A key technique used by the present invention allows for quickly identifying and matching chunks and/or chunk descriptors based on part or all of their configurations. This technique involves generating simple unique identifiers (UIDs) that may be quickly compared for equality. As long as UIDs are composable, they may take arbitrary form. However in typical embodiments they are represented as hash values, and for this reason we use "UID" and "hash" (or "hash value") interchangeably.

The Chunk Identifying Module 1340 (A and B), calculates a UID, usually in the form of a hash value, of each chunk descriptor using a technique further detailed in FIGS. 5A (for video) and 5B (for audio). The goal of the UID generation scheme is to synthesize values unique enough to distinguish two similar but not identical configurations, yet inclusive enough to equate those configurations we do deem identical.

A hash value is generated for the chunk. This hash will be composed from (or otherwise associated with, in a one-to-one relationship, a combination of) one or more hash values, each of which represents some sub-component of the configuration. To accurately represent the configuration sub-components, hash values may be composed from values found in the high-level movie timeline description (for example, from the high-level JSON description), from values found in the scene descriptions, and/or from values from other data sources.

FIG. 5A illustrates this process via the responsibilities of the Video Chunk Identifying Module 1340A, according to some embodiments of the present invention. The diagram therein specifies computation of at least one of several values:
  Static hash: A hash value representing all static elements and their configurations, optionally including their positions on the timeline relative to the chunk's position, and optionally including their implicitly or explicitly including their ordinal z-values (step 1344A);
  Dynamic hash: A hash value representing all dynamic elements and their configurations, optionally including their positions on the timeline relative to the chunk's position, and optionally including their implicitly or explicitly including their ordinal z-values (step 1346A);
  Encoder hash: A hash value representing the encoder and its configuration, optionally including values such as output resolution, frames per second (fps), codec name (H.264, png, etc), codec configuration (step 1348A);
  Duration hash: A hash value representing the duration of the timeline interval to which this chunk corresponds (step 1350A).

The ordinal z-values (OZVs) mentioned above are a method for encoding only the order of the scenes without encoding their absolute or even relative positions. They are calculated by retrieving the scene's index in an array of scenes sorted by z-value. For example, suppose we have three scenes with the following z-values:
  Scene A @ z=3
  Scene B @ z=7
  Scene C @ z=1
their OZVs would be as follows:
  OZV(Scene A)=1
  OZV(Scene B)=2
  OZV(Scene C)=0
since Scene C is furthest back, followed by Scene A and then Scene B. To be sure, this method is merely one way to encode the scene order; in practice, any method that does so may in fact be used.

Some or all of the hash values listed above are then combined to create a "full hash" (1352A), which may then be used to identify the chunk by distinguishing its overall configuration based on its sub-configurations.

FIG. 10 is a pseudocode example of a video chunk hashing algorithm, in accordance with some embodiments of the present invention. Here, the hash( ) procedure performs some hashing operation on the input data, while the combine( ) procedure combines the input hash values into a single value. The combine( ) procedure may be based on the commutative XOR operator if it is to be invariant to the order of the input values, or some non-commutative operator if it is to be order sensitive. Moreover, "c.duration" is C-language-style syntax to retrieve the "duration" member contained in the structure named "c".

The effect of the overall procedure in FIG. 10 is to fill in the four sub-component hash values discussed above, and then to combine them into the full hash. It is not necessary to save the sub-component hash values for the purposes of identifying the chunk. However, these values may be useful for other purposes; for example, the static hash may be used in the implementation of the SSMD optimization, discussed later.

The process discussed above has lightly focused on identifying video chunks. The case for audio is very similar. In audio there is no concept of z-space as there is for the video case. The scenes' ordinal z-values should therefore not be factored into the hash calculation for audio chunks.

Toy Examples

Now that we have described the partitioning and naming processes, some toy examples may help to illustrate how the present invention allows us to avoid rendering and encoding chunks of video or audio that have previously been rendered and encoded. For clarity and simplicity, but without loss of generality, these examples will be described in terms of the video case.

Figure 9A:
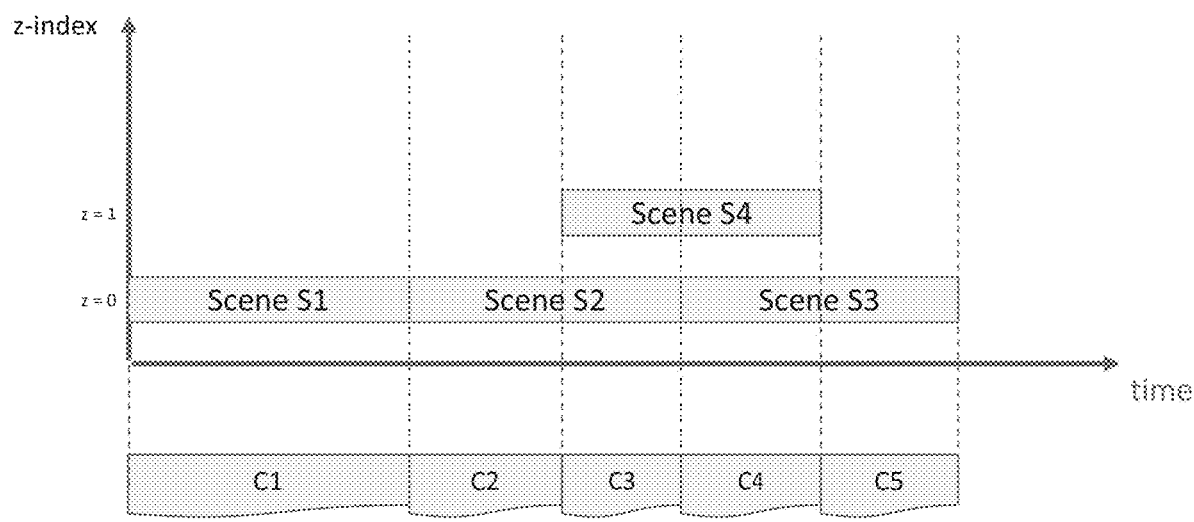
FIG. 9A is an example of partitioning the timeline into chunk descriptors, according to some embodiments of the present invention.
Figure 9B:
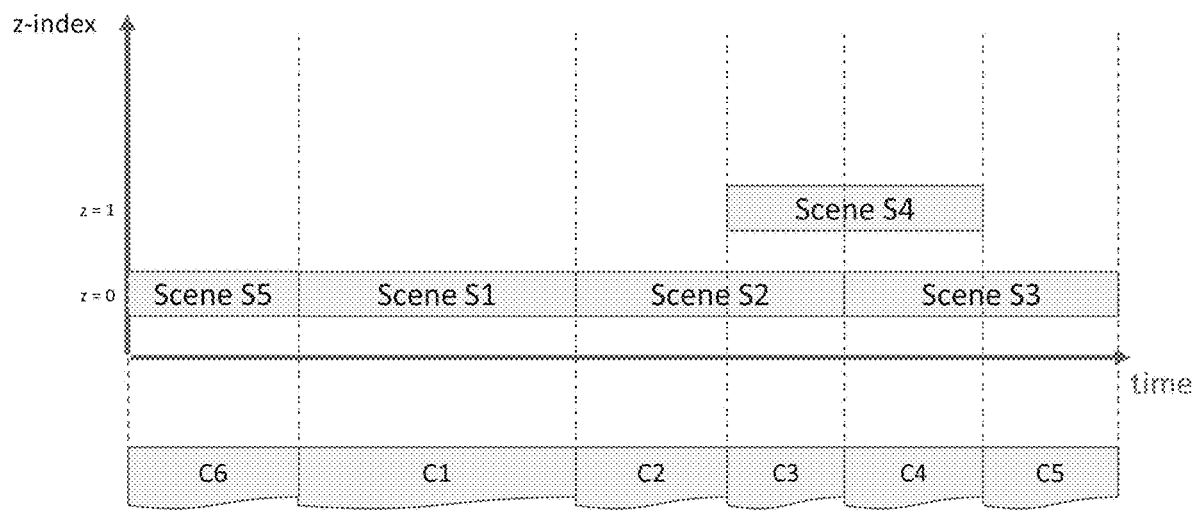
FIG. 9B is another example of partitioning the timeline into chunk descriptors, according to some embodiments of the present invention. This timeline is similar to that of FIG. 9A, except for an additional scene at the beginning scene, and a shift in time for the rest of the scenes.
Figure 9C:
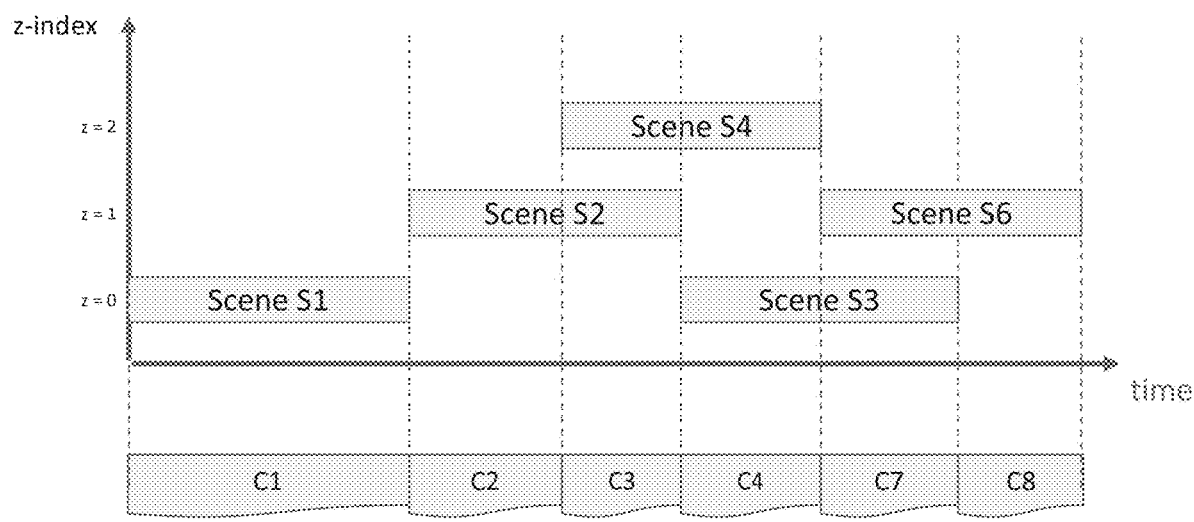
FIG. 9C is another example of partitioning the timeline into chunk descriptors, according to some embodiments of the present invention. This timeline is similar to that of FIG. 9A, except for an additional scene near the end, and a shift in z-value for two of the other scenes.

FIGS. 9A, 9B, 9C show examples of chunk partitioning, according to some embodiments of the present invention. Assuming these movies are rendered in the given order, and with access to the same chunk cache database, we can see some cases where we will save rendering and encoding time. Chunk names ("C1", "C2", etc.) persist across examples to illustrate chunk reuse; for example, chunk "C3" in FIG. 9A is identical to those named "C3" in FIGS. 9B and 9C.

FIG. 9A shows the timeline of the first example movie. It contains four scenes, positioned at two different z-indexes. In this case, the Partition Module has partitioned the timeline into five intervals according to scene boundaries. The table below specifies the scenes associated with each chunk. Inside each structure each scene is associated with its so-called ordinal z-value (OZV). As explained above, OZVs are used because only the z-ordering of the scenes matters, and not the z-distance between them. Bold font specifies which items need to be rendered, which in this case is all of them.

FIG. 9B shows the timeline of the second example movie. It is mostly identical to the movie from FIG. 9A, except that a new scene S5 is found at the beginning, and everything else has been shifted in time to start after S5. Note that chunks C1 through C5 have been shifted in time. However, since we are partitioning at scene boundaries, the partition points relative to the scenes are invariant to such time shifts, and so there is no need to re-render them. Thus C1 through C5 can be reused, and only C6 requires rendering. The table below the timeline indicates in boldface which chunks need to be rendered; everything else should be found in the cache.

FIG. 9C shows the timeline of the third example movie. Here, scenes S2 and S4 have been moved up in z-space. In addition, there is a scene S6 that begins halfway through the duration of S3. This movie seems very different from its predecessors, but since we record ordinal z-values and not absolute or relative z-values, C2, C3 and C4 are found in the cache from the previous examples. Only C7 and C8 need rendering.

Querying the Chunk Cache Database

The Chunk Cache Query Module 1360, queries the Chunk Cache Database 120 for the chunk based on the UID calculated by the Chunk Identifying Module 1340A and/or 1340B. If the chunk is not available in the cache [1366], it is rendered and encoded by the Rendering Module 1380 according to the chunk descriptor, and recorded in the Chunk Cache Database 120 with its UID acting as a retrieval key (step 1368A). If the chunk can be retrieved from the Chunk Cache Database 120, the entire rendering and encoding step may be skipped [1364]. This process is illustrated in FIG. 6.

Rendering and Encoding Chunks (where Necessary)

Figure 7B:
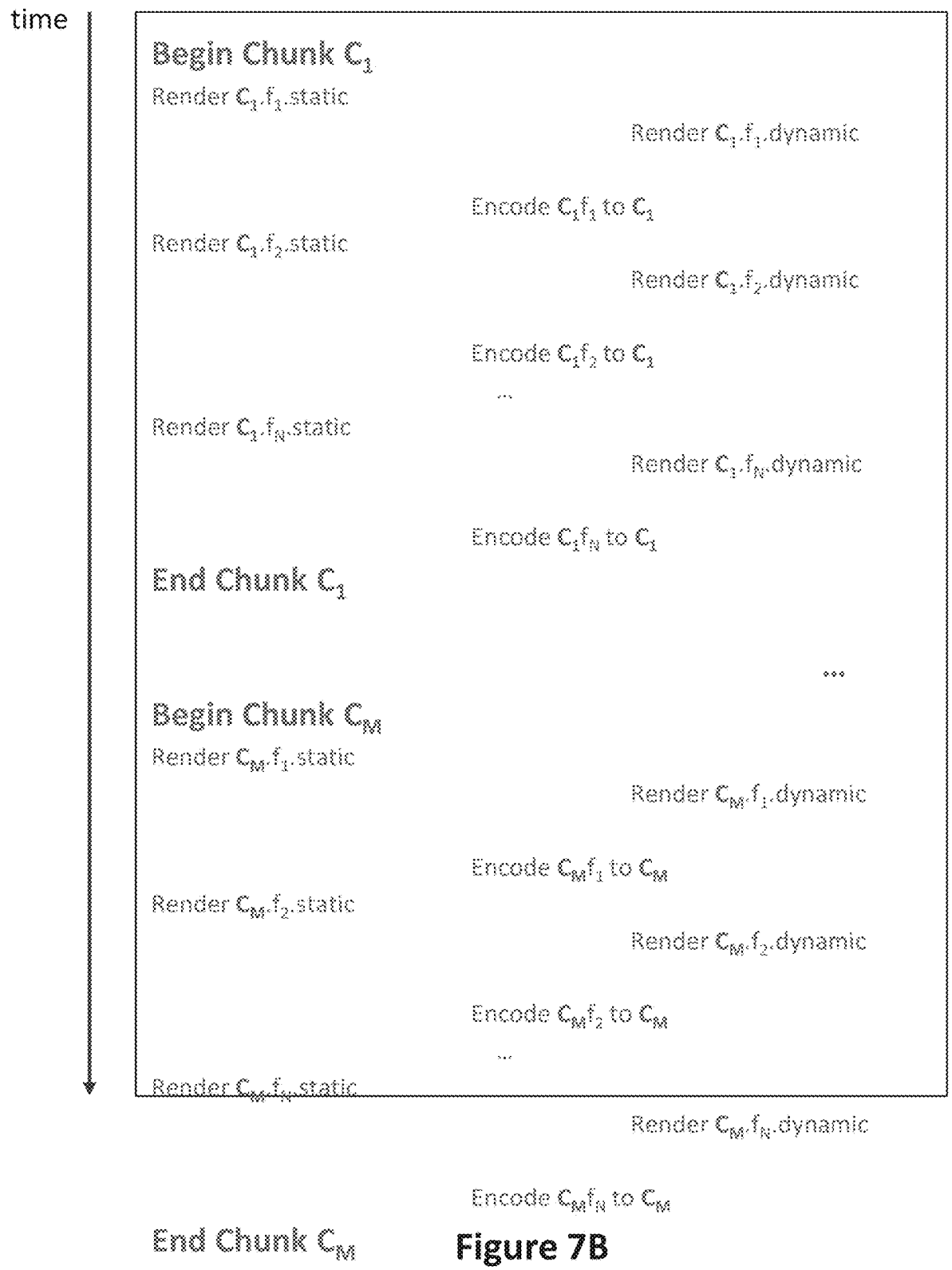
FIG. 7B shows the rendering and encoding events over time for a non-optimized execution of the Video Rendering Module, according to some embodiments of the present invention.

If the chunk was not found in the chunk cache database during the query, the associated Rendering Module 1380[A or B] is activated and instructed to render and encode the chunk based on the information in the chunk descriptor: typically the start and end time with respect to the global timeline, and with the scene graph assembled during initial processing of the request. In the non-optimized case, where each chunk is rendered in isolation, the Rendering Module 1380 renders and encodes all frames or audio samples on the chunk descriptor's specified time interval, and writes everything to the final video or audio chunk. The whole process is illustrated in FIG. 7A, with its execution flow detailed in FIG. 7B. Note that, for the case in which a chunk has both static and dynamic data, the rendering process itself may be thought of as comprising at least two substeps prior to encoding: rendering of the static data and rendering of the dynamic data.

Single Static/Multiple Dynamic (SSMD) Optimization

In accordance with some embodiments of the present invention, two or more dynamic videos may be generated simultaneously. When this occurs, some static chunks, or static components of chunks, say, from two different videos, may be identified as identical by comparing their static hash values. In this case, these chunks or chunk components may be temporarily cached in hardware memory, and ultimately generated only once for use in multiple videos.

In some embodiments, it may be advantageous to implement the so-called Single Static/Multiple Dynamic (SSMD) optimization. This optimization takes advantage of the chunking and hashing scheme described above. However, instead of looking in the cache for a rendered and encoded piece of the video, it optimizes at the rendering level by only rendering static components once for use in multiple chunks.

In more detail, SSMD gathers chunk descriptors for chunks whose static components are identical, even if the dynamic components differ. These chunk descriptors can be trivially compared and grouped together by identifying which chunk descriptors have identical static hash values (1370B). Once grouped, they are rendered and encoded as follows: first, a file is created and opened for each output chunk; next, for each frame in the range, for each chunk in the group, render the frame and encode it to the file corresponding to its chunk; close the files.

Assuming that we have a buffer for rendering intermediate static components, if we implement our rendering process with the outer loop iterating over frames and the inner loop iterating over chunks, the static component buffer does not need to be updated on each successive render call, thus preventing rendering of the static component for all but the first chunk in the group (1374B). This may amount to significant render time savings. The difference may be understood by comparing the execution flow for the non-optimized case (as seen in FIG. 7B) with the execution flow for the SSMD-optimized case (as seen in FIG. 7D). We can see that in the SSMD case, for each frame, all but one of the 'static' render executions across the K chunks in the group may be omitted.

Merging all Components into the Final Movie

When all of the relevant chunks and metadata are available, the Merging Module 1400 may begin producing the desired output. To do so, this module begins with a description of everything needed to produce the final output movie. This description may come from the original request and/or data derived thereof. It may include one or more lists of video and/or audio chunk descriptors, and/or descriptions of streams of information such as subtitles or other metadata. A flow diagram of the Merging Module's behavior is illustrated in FIG. 8, in accordance with some embodiments of the present invention.

The Merging Module 1400 then writes the output according to the output movie description. If the output movie should contain visual information, that is, for any lists of video chunk descriptors, this module collects or receives all of these chunks from either the Chunk Cache Database 120 or the Video Rendering Module 1380A, and copies their contents to the relevant stream in the output, concatenating the chunks in the process[1402A]. The chunks can be simply copied because they have already been encoded via the desired codec. Avoiding re-encoding makes the chunk merging process extremely fast. For the audio case [1402B], the process is very similar, except that audio chunks should be received or collected from either the Chunk Cache Database 120 or the Audio Rendering Module 1380B.

As referenced above, in addition to audio and video data, the output movie description may specify that the final movie should contain streams of other information, such as subtitles, or other kinds of metadata [1404]. If so, the Merging Module 1400 receives or collects the relevant information and writes the relevant streams to the output. The data for these auxiliary streams may come from the request itself or from external sources referenced by the request.

Once the Merging Module 1400 finishes formatting the output and writing to it all of the required streams, the generated output media is complete. The Dynamic Media Generator 130 may now notify the Requesting Entity of completion.

What is claimed is:

1. A method for generating customized dynamic video, implemented by one or more processors operatively coupled to a non-transitory computer readable storage device, on which are stored modules of instruction code that when executed cause the one or more processors to perform said method comprising the steps of:
   a. receiving a request to generate a customized dynamic video;
   b. partitioning said customized dynamic video's timeline, using a predefined partition scheme, into a series of chunk descriptors, each defined by an interval of the timeline and corresponding to a video chunk of the customized dynamic video;
   c. for each chunk descriptor, constructing an identifier based on the combination of a set of parameters that represent visual, temporal and other characteristics of the video chunk, and associating said identifier to the chunk descriptor;
   d. for each chunk descriptor, querying a cache of previously rendered and encoded video chunks for a video chunk indexed by the identifier matching that of the chunk descriptor;
   e. in the case that a video chunk whose identifier matches the queried identifier is found, retrieving said video chunk from the cache;
   f. otherwise, rendering and encoding the video chunk, as specified by the request, for the chunk descriptor's timeline interval, and saving said video chunk in the cache, indexed by the identifier;
   g. merging the video chunks to create the customized dynamic video.

2. The method of claim 1, wherein the predefined partition scheme involves partitioning the video timeline at scene boundaries.

3. The method of claim 1, wherein the predefined partition scheme involves partitioning the video timeline at times when one or more dynamic objects enters into or exits from the video.

4. The method of claim 1, wherein the predefined partition scheme involves partitioning the video timeline into fixed-sized intervals.

5. The method of claim 1, wherein the predefined partition scheme involves partitioning the video timeline around segments with constant color.

6. The method of claim 1, wherein the partitions created by the predefined partition scheme are constrained by predefined partition size.

7. The method of claim 1, wherein the identifier is a hash value and/or based on the result of a hashing calculation.

8. The method of claim 7, wherein the hashing calculation comprises at least one of the following components of hash computing or some combination thereof:
   a. computing the duration hash, representing the duration of the interval associated with the chunk;
   b. computing the static hash, representing the configuration of static elements of the video contained on the interval associated with the chunk;
   c. computing the dynamic hash, representing the configuration of dynamic elements in the video associated with the chunk;
   d. computing the encoder hash, representing the encoder of the video and its configuration.

9. The method of claim 8, wherein the chunk includes only part of a video frame.

10. The method of claim 8, wherein two or more video chunks' static components, identified as identical based on their static hash values, are generated only once but used to render two or more video chunks.

11. The method of claim 10, wherein two or more dynamic videos are generated at the same time, wherein said chunks with identical static components may belong to different output videos.

12. The method of claim 10, wherein said chunks with identical static components belong to the same output video.

13. The method of claim 10, wherein the video timeline consists of a single frame and the output video comprises a still image.

14. The method of claim 1, wherein the chunk descriptor stores intermediate values used to construct the final identifier.

15. The method of claim 1, further comprising the steps of:
   a. receiving a request to generate a customized dynamic audio;
   b. partitioning said customized dynamic audio's timeline, using a predefined partition scheme, into a series of chunk descriptors, each defined by an interval of the timeline and corresponding to an audio chunk of the customized dynamic audio;
   c. for each chunk descriptor, constructing an identifier based on the combination of a set of parameters that represent visual, temporal and other characteristics of the audio chunk, and associating said identifier to the chunk descriptor;
   d. for each chunk descriptor, querying a cache of previously rendered and encoded audio chunks for a audio chunk indexed by the identifier matching that of the chunk descriptor;
   e. in the case that an audio chunk whose identifier matches the queried identifier is found, retrieving said audio chunk from the cache;
   f. otherwise, rendering and encoding the audio chunk, as specified by the request, for the chunk descriptor's timeline interval, and saving said audio chunk in the cache, indexed by the identifier;
   g. merging the audio chunks to create the customized dynamic audio.

16. The method of claim 15, wherein the predefined partition scheme involves partitioning the audio timeline at scene boundaries.

17. The method of claim 15, wherein the predefined partition scheme involves partitioning the audio timeline at times when one or more dynamic audio elements starts or stops playing.

18. The method of claim 15, wherein the predefined partition scheme involves partitioning the audio timeline into fixed-sized intervals.

19. The method of claim 15, wherein the predefined partition scheme involves partitioning the audio timeline around silent segments.

20. The method of claim 15, wherein the partitions created by the predefined partition scheme are constrained by predefined partition size.

21. The method of claim 15, wherein the identifier is a hash value and/or based on the result of a hashing calculation.

22. The method of claim 21, wherein the hashing calculation comprises at least one of the following components of hash computing or some combination thereof:
   a. computing the duration hash, representing the duration of the interval associated with the chunk;
   b. computing the static hash, representing the configuration of static elements of the audio contained on the interval associated with the chunk;
   c. computing the dynamic hash, representing the configuration of dynamic elements in the audio associated with the chunk;
   d. computing the encoder hash, representing the encoder of the audio and its configuration.

23. The method of claim 15, wherein the chunk descriptor stores intermediate values used to construct the final identifier.

24. The method of claim 23, wherein two or more audio chunks' static components, identified as identical based on their static hash values, are generated only once but used to render two or more audio chunks.

25. The method of claim 24, wherein two or more dynamic audio are generated at the same time, wherein said chunks with identical static components may belong to different output audio.

26. The method of claim 24, wherein said chunks with identical static components belong to the same output audio.

27. A system for generating customized dynamic video, implemented by one or more processors operatively coupled to a non-transitory computer readable storage device, which comprise the module of :
   a. partitioning nodule partitioning a requested customized dynamic video's timeline, using a predefined partition scheme, into a series of chunk descriptors, each defined by an interval of the timeline and corresponding to a video chunk of the customized dynamic video;
   b. checking module for constructing an identifier for each chunk descriptor, based on the combination of a set of parameters that represent visual, temporal and other characteristics of the video chunk, and associating said identifier to the chunk descriptor;
   and, querying for each chunk descriptor, a cache of previously rendered and encoded video chunks for a video chunk indexed by the identifier matching that of the chunk descriptor;
   wherein in the case that a video chunk whose identifier matches the queried identifier is found, retrieving said video chunk from the cache;
   otherwise, rendering and encoding the video chunk, as specified by the request, for the chunk descriptor's timeline interval, and saving said video chunk in the cache, indexed by the identifier;
   c. merging module for merging the video chunks to create the customized dynamic video.

28. The system of claim 27, wherein the predefined partition scheme involves partitioning the video timeline at scene boundaries.

29. The system of claim 27, wherein the predefined partition scheme involves partitioning the video timeline at times when one or more dynamic objects enters into or exits from the video.

30. The system of claim 27, wherein the predefined partition scheme involves partitioning the video timeline into fixed-sized intervals.

31. The system of claim 27, wherein the predefined partition scheme involves partitioning the video timeline around segments with constant color.

32. The system of claim 27, wherein the partitions created by the predefined partition scheme are constrained by predefined partition size.

33. The system of claim 27, wherein the identifier is a hash value and/or based on the result of a hashing calculation.

34. The system of claim 33, wherein the hashing calculation comprises at least one of the following components of hash computing or some combination thereof:
   a. computing the duration hash, representing the duration of the interval associated with the chunk;
   b. computing the static hash, representing the configuration of static elements of the video contained on the interval associated with the chunk;
   c. computing the dynamic hash, representing the configuration of dynamic elements in the video associated with the chunk;
   d. computing the encoder hash, representing the encoder of the video and its configuration.

35. The system of claim 27, wherein the chunk includes only part of a video frame.

36. The system of claim 27, wherein the chunk descriptor stores intermediate values used to construct the final identifier.

37. The system of claim 36, wherein two or more video chunks' static components, identified as identical based on their static hash values, are generated only once but used to render two or more video chunks.

38. The system of claim 37, wherein two or more dynamic videos are generated at the same time, wherein said chunks with identical static components may belong to different output videos.

39. The system of claim 37, wherein said chunks with identical static components belong to the same output video.

40. The system of claim 37, wherein the video timeline consists of a single frame and the output video comprises a still image.

* * * * *